United States Patent
Thompson

[11] 3,854,235
[45] Dec. 17, 1974

[54] QUICK-RELEASE CASTING WEIGHT MEANS

[76] Inventor: Robert L. Thompson, 5583 Riverview Dr., Riverside, Calif. 92509

[22] Filed: Aug. 20, 1973

[21] Appl. No.: 390,014

[52] U.S. Cl. .............................................. 43/43.12
[51] Int. Cl. ............................................. A01k 95/00
[58] Field of Search .................................... 43/43.12

[56] References Cited
UNITED STATES PATENTS
2,308,238  1/1943  Baker................................. 43/43.12
3,513,583  5/1970  Leash et al. ....................... 43/43.12

*Primary Examiner*—Louis G. Mancene
*Assistant Examiner*—Daniel J. Leach
*Attorney, Agent, or Firm*—John H. Crowe

[57] ABSTRACT

A casting weight for use in carrying a baited fishing line to a desired spot on the water, when the line is cast, which quickly releases itself from the line as it hits the water. The casting weight is formed by wrapping a raw glass marble weighing approximately one ounce in a piece of water-soluble paper. The paper wrapper is large enough to provide a snug fitting pouch around the marble and leave enough excess to be pinched into a "neck" adjacent the pouch and extend outwardly from the neck in a tail-like configuration. The fishing line is tied, near its baited end, around the neck of the casting weight wrapper with a knot which comes undone if the paper is removed. As the baited end of the line carrying the casting weight settles onto the water surface, after it is cast, the paper pouch holding the marble quickly starts to dissolve and the weight of the marble causes the weakened pouch to almost instantaneously rupture. When this occurs, the marble drops free of the pouch to leave the baited line at the water surface for the attraction of surface feeding fish.

8 Claims, 3 Drawing Figures

QUICK-RELEASE CASTING WEIGHT MEANS

BACKGROUND OF THE INVENTION

This invention relates generally to casting weight means for use on baited fishing lines, and more particularly to such weight means adapted to quickly release themselves from the lines when they (the lines) are cast upon water for surface fishing purposes so that said lines are not dragged under water and out of reach of surface fish.

Conventional deep-sea fishing tackle does not lend itself particularly well to the casting of bait into schools of surface fish some distance from fishing boats or the like. In order to achieve good casting distance with a fishing line, a weight must be attached to the line near its baited end, and this weight tends to pull the bait down when the line hits the water. Although a fish can snap at the bait before it has sunk very far, the bait is often pulled far enough under the water to be out of reach of surface fish before any of them have a chance to take the bait. Without a weight, the line could not, of course, be cast very far with any degree of accuracy. If a reasonably priced weight were provided which automatically released itself from the line as the line hits the water, this would be a great boon to deep-sea fishermen attempting to catch fish in surface schools. So far, however, no one has, to my knowledge, provided a weight of this type.

SUMMARY OF THE INVENTION

I have now, by the present invention, provided a quick-release casting weight means particularly suitable for use by deep-sea fishermen angling for surface fish. The weight means is formed by wrapping a suitably heavy object, preferably a raw glass marble weighing about 1 ounce, in a piece of paper of a type which rapidly disintegrates, or dissolves, in water. The piece of paper should preferably be of large enough size to form a snug fitting pouch around the weight and provide sufficient excess so that it can be pinched or squeezed into a neck-like configuration (hereinafter called neck) adjacent the pouch and crimped to extend away from the neck in the form of a diverging "tail." The weight means can be easily affixed to the fishing line by looping the line around its neck and fastening it (the line) tightly in place by means of a knot which comes undone when the paper is removed. When the line, with the weight means thus attached, is cast onto the water, the pouch carrying the weight begins to disintegrate almost instantaneously, and the weight drops out. The remaining part of the paper wrapper then dissolves, and the line pulls itself free of said knot. The line, now free of the sinking weight, remains at the water surface long enough to permit nearby fish to snap at its bait. The weight means of this invention thus serves ideally to provide the necessary weight for the accurate casting of fishing lines considerable distances, while releasing itself almost instantaneously from the lines once it comes into contact with water to thereby leave the lines free at the water surface so that nearby surface fish can snap at its baited end before that end has a chance to sink very far.

It is thus a principal object of this invention to provide quick-release casting weight means which can be quickly and easily affixed to a baited fishing line to permit accurate casting of the line substantial distances to achieve favorable positioning of the bait for surface fishing purposes, and which automatically frees itself from the line after it impacts the water surface to leave said line free at the surface so that its baited end is in easy striking distance of surface fish.

It is another object of the invention to provide such casting weight means of simple and inexpensive character and dependable serviceability.

Other objects, features and advantages of the invention will become apparent in the light of subsequent disclosures herein.

DESCRIPTION OF PREFERRED EMBODIMENT

Figure 1:
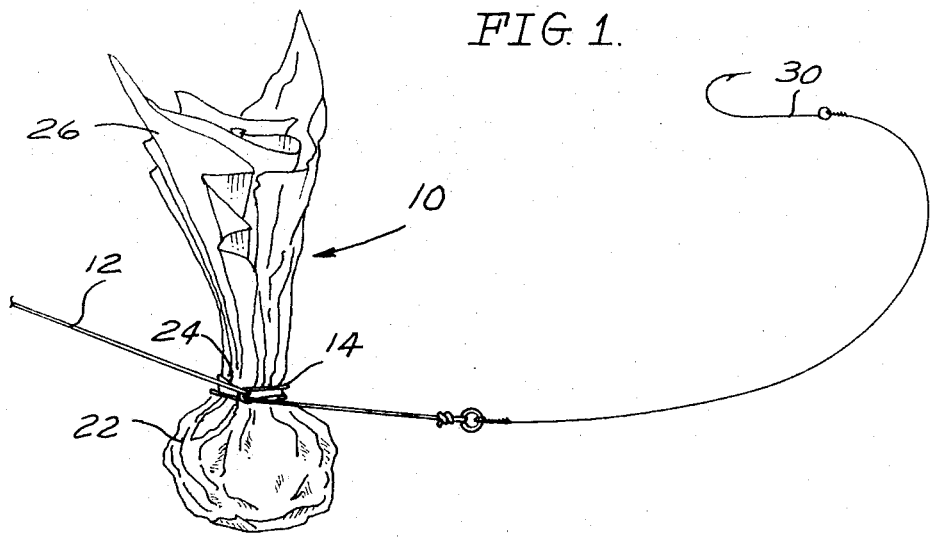
FIG. 1 shows, in perspective, a preferred form of casting weight means in accordance with this invention attached to a fishing line for use, near the bait carrying end of said line.
Figure 2:
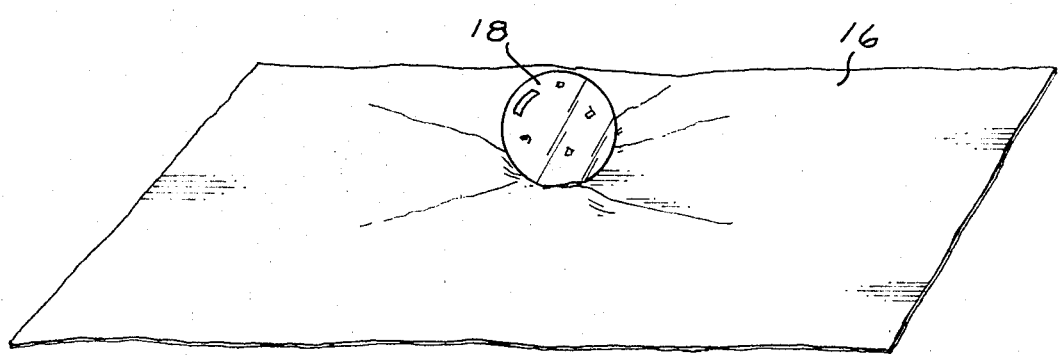
FIG. 2 is a perspective view of a weight and piece of water-soluble paper from which the weight means of FIG. 1 is formed, the weight and paper being shown in relative positions conducive to formation of the weight means therefrom.

Considering now the drawing in greater detail, with emphasis first on FIG. 1, there is shown generally at 10 a casting weight means of preferred form in accordance with this invention attached to a fishing line 12 near its forward, or bait-carrying, end. The casting weight means 10 is simply a raw glass marble 18 wrapped in a rectangular piece of water-soluble paper 16 (see FIG. 2, which shows the marble and paper separately). The wrapping is achieved by placing the marble at the approximate center of the piece of paper, and then wrapping the paper snugly around the marble to enclose it in a tight fitting pouch such as shown at 22 in FIG. 1, pinching the excess paper into a neck, such as shown at 24 in FIG. 1, adjacent the pouch, and crimping the remaining paper to shape it into a flaring tail, such as shown at 26 in FIG. 1. FIG. 2 shows the relative positions of the marble and paper at the beginning of this wrapping procedure. After the casting weight means 10 has been formed, it is a simple matter to quickly tie a fishing line around its neck in the manner illustrated at 14 in FIG. 1. Preferably the line is tied with a knot such as that illustrated, or the equivalent, which comes undone when the weight means is separated from the line in the below-described manner.

The raw glass marble 18 is a generally spherical globule of glass of a type available in bulk quantities at low cost (1/5¢ each when bought in sufficient quantity) from Johns-Manville Co. These raw glass marbles, as the name implies, are formed from molten glass of a type suitable for conversion into spun glass products, such as, for example, spun glass insulation material for attics, and they are easy to ship in bulk for such industrial purposes. While raw glass marbles are, as indicated above, prepared and shipped primarily for use as starting materials in the manufacture of industrial glass products, they are available, in bulk, to anyone for a price, from Johns-Manville Co., and no doubt from other sources as well. My invention is not limited to the use of such raw glass marbles, however, and any suitable weights, such as lead weights, or the like, can be substituted therefor if desired.

The water-soluble paper 16 is preferably a carboxymethylcellulose base product containing minor amounts of finely divided cellulosic fibers, sodium carbonate and titanium dioxide to give it paper-like qualities and an opacity similar to that of conventional paper. A suitable product of this type is available from Gilbreth Co., of Philadelphia, under the trade-mark Dissolvo. Dissolvo paper is available in various grades, most of which are soluble in fresh water, and at east one of which (stock number SW6080) is soluble in sea water. This latter grade would be best suited for use in salt water by deep-sea anglars, although it is also soluble in tap water, so could be employed by trout, salmon, and other fresh-water fishermen who do not want their lines rapidly dragged to the bottom by casting weights.

Typical Dissolvo paper formulations contain the following ingredients, in the relative quantities specified (in parts by weight) below.

carboxymethylcellulose (CMC): 80–90
finely divided cellulosic fibers: 3–10
sodium carbonate: 2–5
titanium dioxide: 1

Sodium carboxymethylcellulose is a non-toxic film former used for the thickening of desserts and in various edible products. The incorporation of cellulosic fibers in the Dissolvo formulation results in the formation of a paper-like material which can be torn similarly to the way conventional paper is torn. The sodium carbonate and titanium dioxide give the product an opacity similar to that of conventional paper. While Dissolvo paper is not conventional paper, it has certain characteristics in common with the latter, and, for lack of a better term, is considered generically herein as a form of paper (which happens to be water-soluble). I am not certain whether Dissolvo paper is completely water-soluble, or whether it is partly water-soluble and partly dispersible in water. Since the advertising literature of the Dissolvo paper manufacturer indicates that this paper dissolves completely in water, however, it has been referred to herein as a water-soluble paper. It should, of course, be understood that my invention is not limited to the use of Dissolvo paper, but can employ any paper, or paper-like material, which either dissolves or disintegrates rapidly in water to achieve the purposes taught herein. All such papers, or paper-like products, will be generically referred to herein, for lack of a more precise term, as paper.

Figure 3:
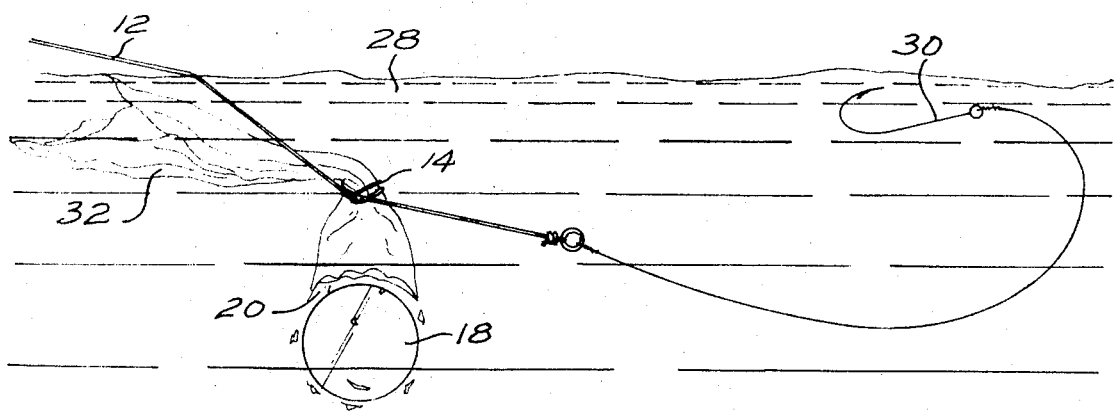
FIG. 3 shows the casting weight means and fishing line of FIG. 1 as it appears just after being cast into the water, the line being shown free of bait for better illustrative effect.

When a baited fishing line with weight means 10 attached is cast, the weight means hits the water with its pouch 22 down, and instantaneously starts to dissolve. This weakens the walls of the pouch, and the down-bearing weight of the marble 18 thereon quickly causes the pouch to rupture and permit the marble to sink free of the pouch and line. FIG. 3 shows the marble just after it has fallen free of the pouch, the resulting opening in the lower portion of said pouch being shown at 20. As the remaining part of the paper wrapper of weight means 10 sinks into the water, it softens, turns first translucent and then transparent and, finally, dissolves, all within a matter of seconds. The escape of the marble from the pouch of course occurs long before the bulk of the wrapper dissolves, perhaps within a tenth or twentieth of a second from the time the weight means impacts the water. The limp, softened condition of the tail portion 26 of the paper wrapper of weight means 10 is illustrated at 32 in FIG. 3. It will be understood that the bait receiving end of fishing line 12 has a hook for the attachment of bait, such a hook being shown at 30 in the drawing. For better illustrative effect, the bait is omitted from hook 30 in FIG. 3, although it will be appreciated that the hook would normally carry bait if cast into water in the manner there illustrated, the water being indicated by the reference numeral 28 in that figure.

As previously indicated, the casting weight means of this invention is suitable for use by either salt- or fresh-water fishermen. Surface feeding salt-water fish particularly vulnerable to the use of the casting weight means of this invention include, among others, tuna and yellow tail. Fresh-water fishermen who would derive benefit from my novel casting weight means include trout, bass, and salmon (all surface feeding fish) fishermen. Trout anglers, in particular, would benefit from the use of said casting weight means since it would enable them to cast a light fly, for example, a fly weighing only about one-eighth ounce, to a desired spot, after which the casting weight means would drop away from the line and leave the light fly on the surface.

It should be emphasized that no part of casting weight 10, at least in its preferred form, is toxic or a water pollutant when committed to a body of water in use. Thus, when the water-soluble paper 16 is Dissolvo paper, it is nontoxic, tasteless and odorless; contains no preservatives, bactericides or other harmful substances; and is stated by the manufacturer to be harmless even when ingested by a small child. The raw glass marble 18 is pure glass and no more harmful to water environments than silica sand, the main ingredient of glass and the principal component of large portions of the bottoms and shorelines of many, if not most, bodies of water.

While the novel casting weight means of this invention has been herein illustrated and described in what I consider to be its preferred embodiment, it will be understood by those skilled in the art that various departures may be made therefrom within the scope of the invention. Some of these departures have already been mentioned, and others will occur to those skilled in the art in the light of present teachings. An example of one such departure would be the inclusion of suitable means for holding the paper wrapper snugly around the weight, one such means, for example, being a small rubber band placed around the neck of the wrapper. The purpose of this would be to help the casting weight means retain its proper shape, as illustrated in FIG. 1, prior to the time of actual attachment of the weight means to a fishing line, since after this the fishing line will, of course, accomplish the same purpose until such time as the weight means impacts the water. Two or more raw glass marbles, or equivalent weights, can be used in lieu of only one such weight in the casting weight means of this invention if desired.

In summary, the scope of the present invention extends to all variant forms thereof encompassed by the language of the following claims.

I claim:

1. Quick-release casting weight means suitable for use in the casting of a baited fishing line to a desired spot on the water for surface fishing purposes, comprising at least one casting weight and at least one piece of paper adapted to come apart immediately upon contact with said water, said paper being wrapped around said casting weight in such manner as to permit the attachment of said fishing line to the paper so that the weight means remains affixed to said line until the latter is cast to said desired spot; whereby the line with said weight means so attached can be cast to said spot, and said paper then immediately begins coming apart in said water to release the casting weight which sinks without dragging the line down so that said line remains substantially at the surface of the water.

2. Quick-release casting weight means in accordance with claim 1 in which said at least one piece of paper is a single piece of paper and the attachment of said fishing line to said paper is accomplished by means of a knot in said line, which knot is of a type that comes undone when said paper comes apart in said water, whereby the line is then automatically freed of said knot.

3. Quick-release casting weight means in accordance with claim 2 in which said piece of paper is large enough to form a snug fitting pouch for said at least one casting weight with excess paper left over and is wrapped around the casting weight to provide such a pouch, the excess paper being pinched together to form a neck adjacent said pouch and crimped into the shape of a flaring tail extending outwardly from said neck.

4. Quick-release casting means in accordance with claim 3 in which said knot attaching said fishing line to said paper holds the line in encirclement of said neck.

5. Quick-release casting weight means in accordance with claim 4 in which said piece of paper is of rectangular shape.

6. Quick-release casting weight means in accordance with claim 5 in which said at least one casting weight is a raw glass marble of approximately one ounce weight.

7. Quick-release casting weight means in accordance with claim 6 in which said piece of paper is formulated from a major amount of carboxylmethylcellulose, and minor amounts of finely divided cellulosic fibers, sodium carbonate and titanium dioxide.

8. Quick-release casting weight means in accordance with claim 7 in which the relative quantities of the ingredients of said paper are, in parts by weight, from about 80 to about 90 carboxymethylcellulose, from about 3 to about 10 finely divided cellulosic fibers, from about 2 to about 5 sodium carbonate and about 1 titanium dioxide.

* * * * *